Patented Nov. 6, 1928.

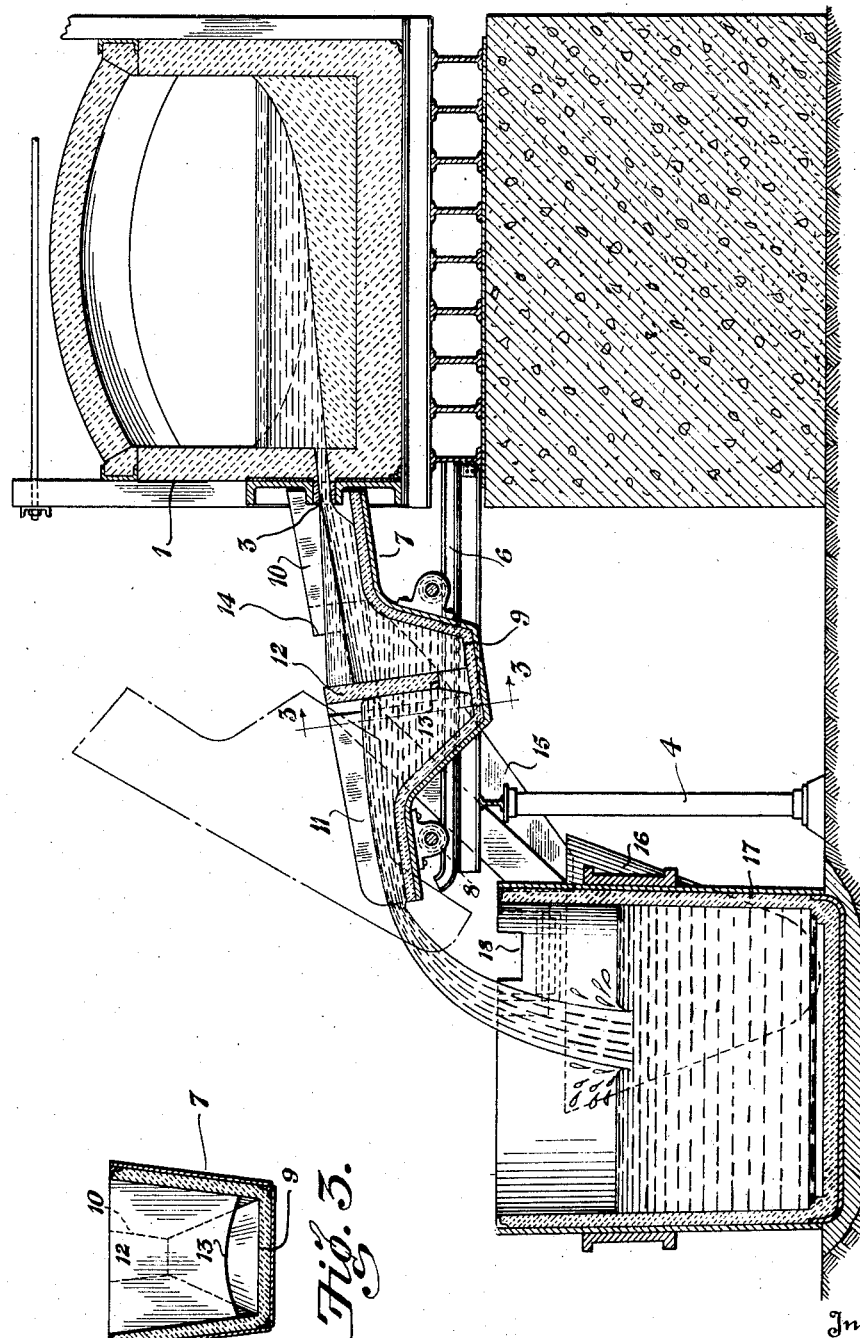

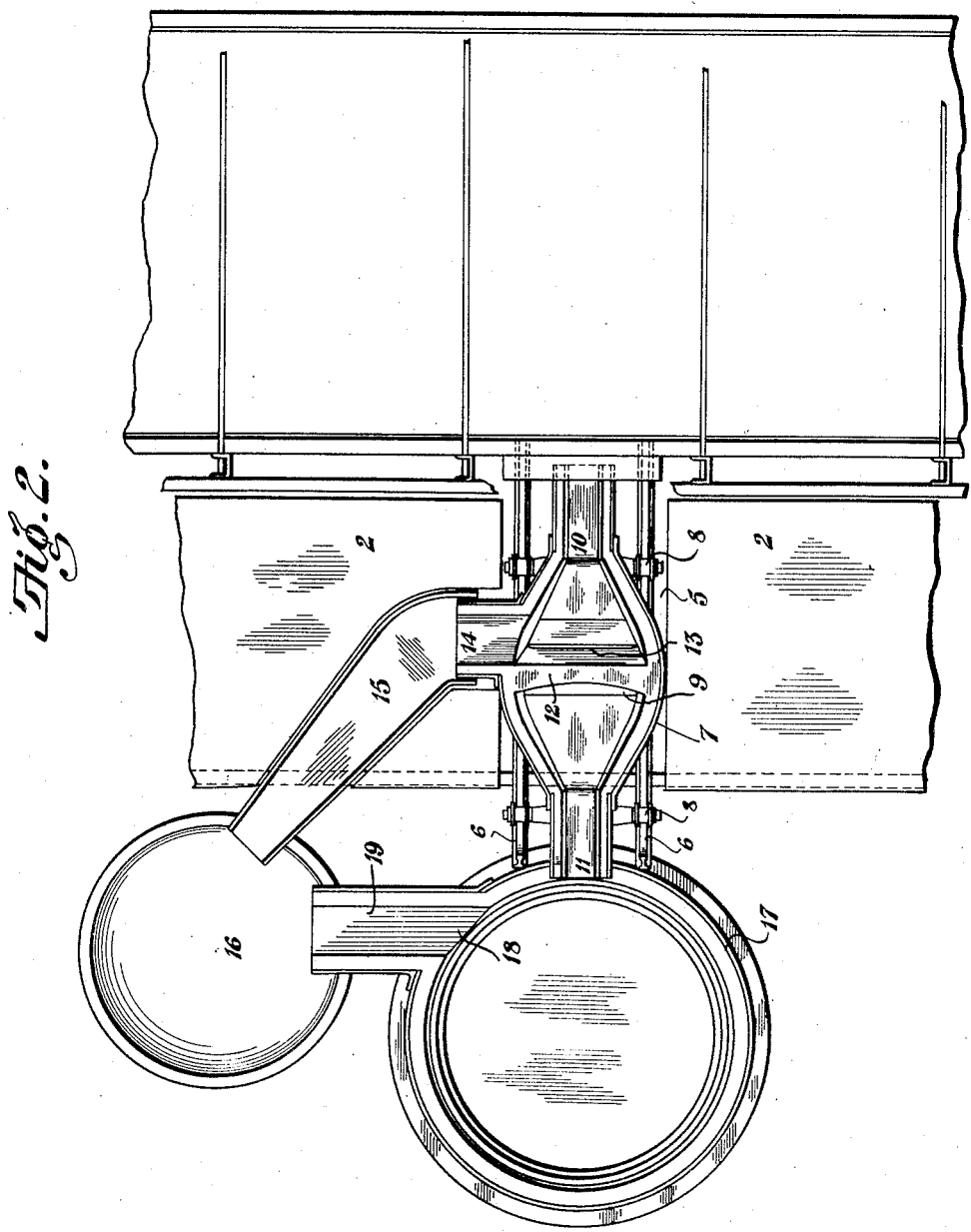

1,690,748

UNITED STATES PATENT OFFICE.

FREDELLIA H. MOYER, OF CANTON, OHIO.

SLAG AND GAS ELIMINATOR FOR MOLTEN STEEL.

Application filed July 24, 1926. Serial No. 124,609.

The invention relates to the pouring of molten steel from an open hearth furnace and the like to the ladle and more particularly to means for separating gas and slag from the molten steel in its passage from the furnace to the ladle.

In the operation of steel melting furnaces and the like it is customary to add ore, limestone and other materials to the steel to form a slag for the purpose of absorbing impurities and cleaning up the metal; and when the furnace is tapped this slag is permitted to run out of the furnace together with the molten metal, through the pouring spout and directly into the ladle from which the steel is poured to the ingot molds and the like.

The molten metal and slag thus intermingle, causing the slag to be beaten into the metal as it is poured where it is held in the form of slag inclusions; and forming a layer of slag upon the surface of the steel as it reaches the ladle whereby additional steel entering the ladle must pass through this blanket of slag upon the surface, forcing additional slag into the molten steel in the ladle.

There is also a gas forming action due to the combination of the molten steel and slag in the furnace, this action continuing during the tapping of the furnace and for some time after the steel is poured into the ladle. The gas thus formed is beaten into the steel in finely divided particles, as the steel is poured into the ladle, and it is usual practice to hold the molten metal in the ladle for several minutes, before pouring into the ingot molds, in order to permit this gas to escape, as well as to allow the particles of slag to rise to the surface, thus lessening the amount of gas in the form of minute bubbles and also the small particles of slag from the steel.

When minute particles of slag or small volumes of gas are trapped in the steel and remain in the ingot, imperfections are formed which will appear in the finished product, causing the rejection of such steel by the purchaser.

The object of the present improvement is to provide means for separating the gas and slag from the molten steel in its passage from the furnace to the ladle, thus preventing the slag inclusions and minute gas bubbles from being carried into the ladle, and obviating the necessity of holding the ladle for several minutes before the steel is poured to the ingot molds.

The above and other objects may be attained by providing a tapping receptacle, such as a runner, through which the steel is poured from the furnace to the ladle, this runner having an enlarged deepened well portion provided with a dam, or slag baffle, spaced slightly above the bottom of the enlarged depressed portion of the runner and so arranged that the steel, which is heavier than the slag, will pass beneath the dam while the lighter slag will remain on top of the steel and be drawn off through a suitable opening in the side of the runner and conveyed to a slag pot or the like.

This well portion of the runner may be widened, as well as deepened, for the purpose of increasing its volume and consequently slowing down the movement of the metal therethrough, in order to permit more time for the slag separation, this retarding of the flow of the metal permitting time for the gases to be liberated from the steel, the metal being thus cleared of both slag and gases before it is poured into the ladle.

An embodiment of the invention is illustrated in the accompanying drawings, in which Figure 1 is a vertical sectional view through a furnace equipped with the improved slag and gas eliminator, showing the operation of pouring;

Fig. 2, a plan view of the same, and

Fig. 3, a section on the line 3—3, Fig. 1.

Similar numerals refer to similar parts throughout the drawings.

An open hearth is indicated generally at 1, a platform 2 being supported beneath the level of the pouring opening 3 of the furnace, being mounted upon the uprights 4.

This platform may have an opening as at 5, directly beneath the pouring opening of the furnace, rails 6 being located therein, for the purpose of supporting the improved tapping receptacle, which may be in the form of a spout or runner to which the invention pertains and which is indicated generally at 7.

Wheels or rollers 8 may be provided upon the runner for engagement with the rails whereby the runner may be quickly and easily positioned for pouring.

The runner is inclined downwardly, away from the furnace, when positioned with its upper end adjacent to the pouring opening 3, as illustrated in the drawings and is provided intermediate its ends with a widened and deepened well 9 of considerably greater volume than the receiving and pouring through portions 10 and 11 respectively.

A dam 12 is located transversely through the well, the lower edge thereof terminating at a point spaced from the bottom of the well as shown at 13.

An opening 14 is formed in the side of the well, above the dam and communicates with a slag spout 15 inclined downward from the runner to a slag pot 16. The ladle 17, which may be of usual construction, is mounted beneath the discharge end of the runner and may be provided with an opening 18 in its upper edge portion, connected to a slag spout 19 which also leads to the slag pot.

When the furnace is tapped the molten metal will run from the pouring opening 3 into the improved runner, the slag being lighter than the steel, passing through the side opening 14 to the slag spout while the heavier steel will pass beneath the dam 12 and thence through the discharge trough of the runner to the ladle.

The enlarged well in the central portion of the runner considerably increases the volume of the runner at this point and consequently slows down the travel of the metal permitting more time for slag separation, this retarding action of the flow of the metal permitting more time for the gases to be liberated, especially after the metal has passed the dam and is unobstructed by slag.

The steel is thus cleared of both slag and gas as it passes through the runner and the clean metal is poured into the ladle without having to pass through a heavy blanket of slag as is the case in the present method of pouring steel from the furnace to the ladle.

As the ladle is filled any slag which may still remain in the steel will rise to the surface and be taken off through the opening 18.

Once the ladle is filled with molten metal it may be immediately poured into the ingot molds as it is practically free of gas and slag inclusions.

I claim:

In combination with a steel melting furnace having a pouring opening, rails located adjacent to the pouring opening, a tapping receptacle adapted to receive molten metal from the furnace, a well intermediate the ends of the receptacle, a dam in the well terminating at a point spaced from the bottom of the well, and rollers on the receptacle for engagement with the rails.

In testimony that I claim the above, I have hereunto subscribed my name.

FREDELLIA H. MOWER.